(12) United States Patent
Mori et al.

(10) Patent No.: US 8,837,864 B2
(45) Date of Patent: Sep. 16, 2014

(54) IMAGE SYNTHESIS AND ROTATION PROCESSING APPARATUS AND IMAGE SYNTHESIS PROCESSING METHOD

(75) Inventors: Chisato Mori, Tokyo (JP); Yoshinobu Sato, Yokohama (JP)

(73) Assignee: Canon Kabushiki Kaisha (JP)

( * ) Notice: Subject to any disclaimer, the term of this patent is extended or adjusted under 35 U.S.C. 154(b) by 73 days.

(21) Appl. No.: 13/252,297

(22) Filed: Oct. 4, 2011

(65) Prior Publication Data

US 2012/0087585 A1    Apr. 12, 2012

(30) Foreign Application Priority Data

Oct. 7, 2010    (JP) ................. 2010-227606

(51) Int. Cl.
- *G06K 9/32* (2006.01)
- *G06T 11/00* (2006.01)
- *H04N 5/262* (2006.01)
- *G06T 3/60* (2006.01)

(52) U.S. Cl.
CPC .............. *H04N 5/2621* (2013.01); *G06T 11/00* (2013.01); *G06T 3/60* (2013.01)
USPC ........................................................ 382/296

(58) Field of Classification Search
CPC .................................................. H04N 1/3877
See application file for complete search history.

(56) References Cited

U.S. PATENT DOCUMENTS

2002/0140829 A1*  10/2002  Colavin et al. ........... 348/231.99
2008/0122953 A1*   5/2008  Wakahara et al. ............. 348/241

FOREIGN PATENT DOCUMENTS

| JP | H05-120417 A | 5/1993 |
| JP | 2009094902 A | 4/2009 |

OTHER PUBLICATIONS

Kekre, H. B., and Sudeep D. Thepade. "Rotation Invariant Fusion of Partial Image Parts in Vista Creation using Missing View Regeneration." WASET International Journal of Electrical Computer and Systems Engineering (IJECSE) 2.2 (2008): 94-101.*
Brown, Matthew, and David G. Lowe. "Automatic panoramic image stitching using invariant features." International Journal of Computer Vision 74.1 (2007): 59-73.*
Zongker, Douglas E., et al. "Environment matting and compositing." Proceedings of the 26th annual conference on Computer graphics and interactive techniques. ACM Press/Addison-Wesley Publishing Co., 1999.*

* cited by examiner

*Primary Examiner* — Bhavesh Mehta
*Assistant Examiner* — Andrew Moyer
(74) *Attorney, Agent, or Firm* — Rossi, Kimms & McDowell LLP (57) ABSTRACT

An image synthesis processing apparatus capable of synthesizing a foreground image and a background image into an image, which is sharp and natural in color, with a simple system construction that does not require a special hardware structure and special arithmetic processing, without causing color mixing at a boundary between replacement color pixels and other pixels in the foreground image. The background image is rotated by a first rotation unit of the image synthesis processing apparatus by a predetermined rotation angle in a direction opposite to an instructed rotation direction, the background image after rotation in the opposite direction and the original foreground image are synthesized into a synthesis image by a synthesis unit, and the synthesis image is rotated by a rotation unit by the predetermined rotation angle in the instructed rotation direction, thereby generating a desired image.

4 Claims, 9 Drawing Sheets

IMAGE SYNTHESIS AND ROTATION PROCESSING APPARATUS AND IMAGE SYNTHESIS PROCESSING METHOD

BACKGROUND OF THE INVENTION

1. Field of the Invention

The present invention relates to an image synthesis processing apparatus and an image synthesis processing method.

2. Description of the Related Art

An image synthesis process is known where an image is enlarged/reduced and the enlarged/reduced image is synthesized with another image (by replacing a portion of the other image with the enlarged/reduced image).

In such an image synthesis process, a foreground image including replacement color pixels is sometimes rotated and the rotated foreground image is synthesized with the background image, if both the background and foreground images are of YUV format.

In YUV422 which is one of the YUV systems where color is represented by a brightness signal Y, blue color difference signal U, and read color difference signal V, information of color difference signals U, V is shared between adjacent two horizontal pixels to reduce a data amount, while preventing image quality deterioration. In YUV444 which is another YUV system, brightness signal Y and color difference signals U, V are sampled from each of every four horizontal pixels.

To rotate a foreground image and synthesize the rotated foreground image with a background image, the foreground image is converted from YUV422 format to YUV444 format, the format-converted foreground image is rotated, and the rotated foreground image is converted from YUV444 format to YUV422 format. At that time, due to pixel interpolation processing, color mixing is sometimes caused between some of replacement color pixels and other image data pixels in the foreground image. As a result, color-mixed pixels appear at a boundary between the background and foreground images, so that the boundary between the images becomes unclear.

Generally, if the degree of color mixing between image data pixel and replacement color pixel is less than a threshold value, color-mixed pixels are each regarded as a replacement color pixel.

Heretofore, a method has been proposed that converts a color-mixed pixel into a replacement color pixel by using algorism or the like. Also proposed is an image synthesis method, in which when an image with a transparent portion is enlarged/reduced and the enlarged/reduced image is synthesized with another image, complementary processing is performed to prevent the synthesized image from becoming unnatural (see, for example, Japanese Laid-open Patent Publication No. 2009-94902).

Still another image synthesis method has been proposed, in which interpolation is performed between replacement color pixels and image data pixels in a foreground image, thereby causing a boundary between the foreground and background images to be natural (see, for example, Japanese Laid-open Patent Publication No. H5-120417).

In this method, an adjustment object region to be subjected to adjustment or modification (hereinafter, referred to adjustment) is extracted from a color image, a target color in the adjustment is specified, and the color of the entire adjustment object region is changed to the target color. At that time, in addition to the color adjustment for the adjustment object region, an additive color mixing process is performed on a boundary between a background part and the adjustment object region. As a result, natural color adjustment or image synthesis is realized, while maintaining data continuity in the original image, thereby making it possible to prevent a pseudo contour from being generated at the boundary between the adjustment object region and the other region, so that the nature of image is not impaired. When two images are synthesized, color adjustment is performed at a boundary of the two images such that the synthesized image becomes natural.

Since an ordinary digital camera or the like is limited in processing speed and memory capacity, image processing is performed in YUV422 format. In the YUV422 format, information of color difference signals U, V is shared between adjacent two pixels, and therefore, interpolation processing is performed to generate UV data for each pixel at the time of conversion from YUV422 format to YUV444 format. As a result, color mixing is caused in each two pixels. In other words, color mixing tends to occur at a boundary between image data pixels and replacement color pixels in a foreground image when image processing is performed in YUV422 format than when performed in YUV444 format, so that a clear synthesis image cannot be generated.

SUMMARY OF THE INVENTION

The present invention provides an image synthesis processing apparatus and an image synthesis processing method, which are capable of synthesizing a foreground image and a background image into an image, which is sharp and natural in color, with a simple system construction that does not require a special hardware structure and special arithmetic processing, without causing color mixing at a boundary between replacement color pixels and other pixels in the foreground image.

According to one aspect of this invention, there is provided an image synthesis processing apparatus that rotates at least one of a background image and a foreground image and then synthesizes the foreground image and the background image, which comprises a first image rotation processing unit configured to rotate the background image by an instructed rotation angle in an opposite direction which is opposite to an instructed rotation direction, a synthesis processing unit configured to synthesize the background image after rotation and an original foreground image, thereby generating a synthesis image, and a second image rotation processing unit configured to rotate the synthesis image by the instructed rotation angle in the instructed rotation direction.

According to the present invention, a foreground image and a background image can be synthesized into an image, which is sharp and natural in color, with a simple system construction that does not require a special hardware structure and special arithmetic processing, without causing color mixing at a boundary between replacement color pixels and other pixels in the foreground image, even if image processing is performed in YUV422 format.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
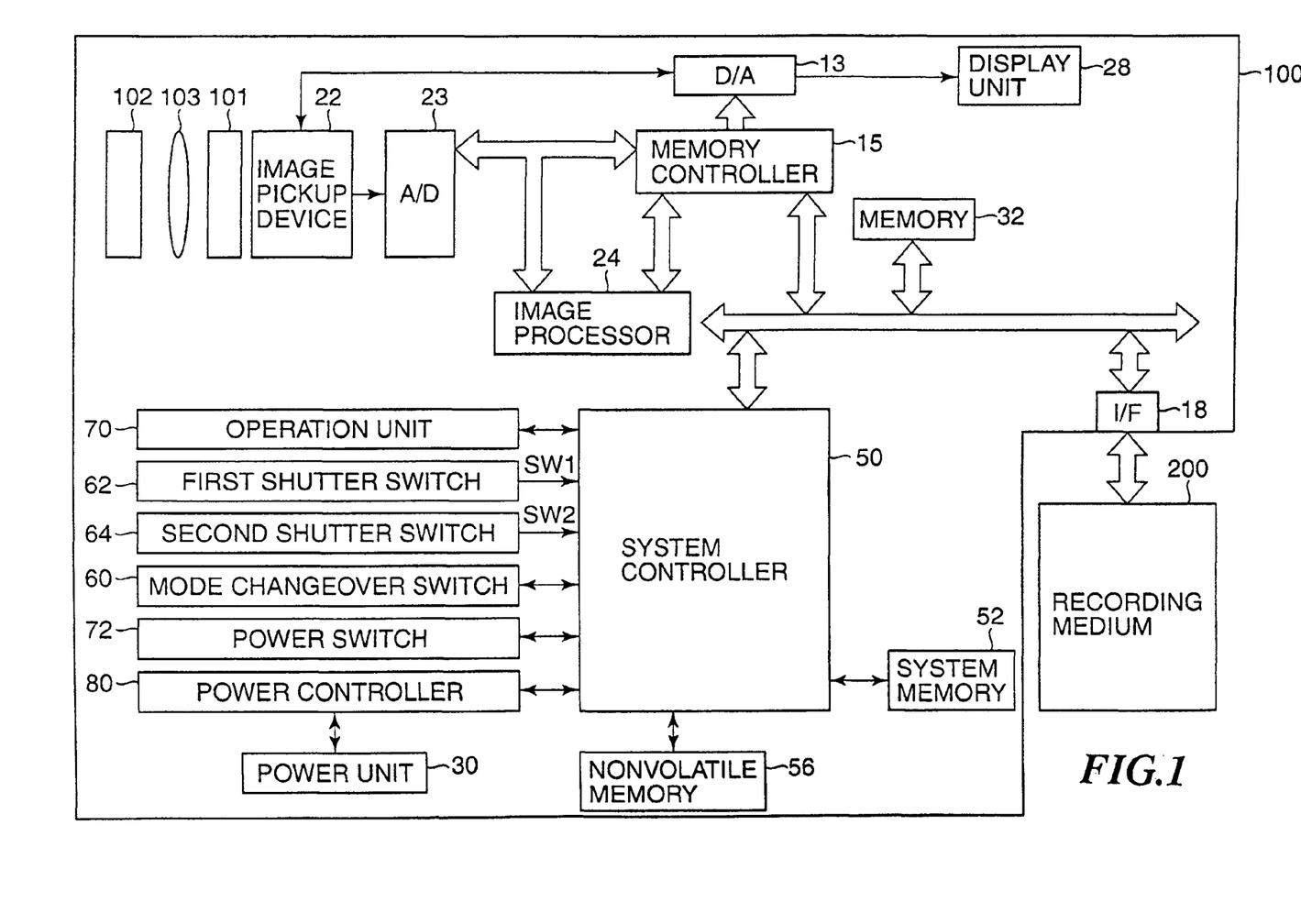
FIG. 1 is a block diagram showing the construction of a digital camera according to one embodiment of this invention.

FIG. 1 shows in block diagram the construction of a digital camera serving as an image synthesis processing apparatus according to one embodiment of this invention.

In FIG. 1, the digital camera 100 includes a taking lens 103 including a focus lens, a shutter 101 having an aperture function, and an image pickup device 22 implemented by, e.g., a CCD or CMOS device that converts an optical image into an electrical signal. A barrier 102 that prevents contamination and damage of an image pickup system including the taking lens 103, shutter 101, and image pickup device 22 is disposed at a free end of the taking lens 103.

Reference numeral 23 denotes an A/D converter that converts an analog signal output from the image pickup device 22 into a digital signal, and 24 denotes an image processor that performs color conversion processing and resizing processing (such as pixel interpolation and reduction) on data supplied from the A/D converter 23 or from the memory controller 15. The image processor 24 performs calculations based on picked-up image data. Based on results of the calculations, the system controller 50 carries out, e.g., exposure control and distance measurement control for performing TTL-AF (through-the-lens auto-focus) processing, AE (automatic exposure) processing, EF (electronic flash) processing, and TTL-AWB (through-the-lens auto-white balance) processing.

Output data from the A/D converter 23 is written into a memory 32 (which is a work memory) via the image processor 24 and the memory controller 15 or via the memory controller 15. The memory 32 stores image data, which is obtained by the image pickup device 22 and then converted into digital data by the A/D converter 23. The memory 32 also functions as a video memory that stores image data to be displayed on a display unit 28, and has a storage capacity large enough to store a desired number of still images and/or a moving image of predetermined time length and/or audio data of predetermined time length.

Reference numeral 13 denotes a D/A converter that converts image data for display stored in the memory 32 into an analog signal, and supplies the analog signal to the display unit 28. Based on the analog signal from the D/A converter 13, display is made on a display device (such as LCD) of the display unit 28.

Reference numeral 56 denotes an electrically erasable and recordable memory implemented by a nonvolatile memory (e.g., an EEPROM) that stores constants, programs, etc. used by the system controller 50 for is operation.

The system controller 50 controls the entire digital camera 100, and executes a program stored in the nonvolatile memory 56 to realize an image synthesis process described later. Reference numeral 52 denotes a system memory implemented by, e.g., a RAM and used to develop constants and variables used by the system controller 50 for its operation and to develop a program read from the nonvolatile memory 56, etc. The system controller 50 also performs display control by controlling the memory 32, D/A converter 13, display unit 28, etc.

The digital camera 100 has a mode changeover switch 60, a first shutter switch 62, a second shutter switch 64, and an operation unit 70, with which a user inputs operation instructions to the system controller 50.

The mode changeover switch 60 is operated by the user to give an instruction to change the operation mode of the system controller 50 between a still image recording mode, moving image recording mode, reproduction mode, etc. The first shutter switch 62 is switched on to generate a first shutter switch signal SW1 when a shutter button (not shown) of the digital camera 100 is operated halfway or half-pressed to give a photographing preparation instruction. When the first shutter switch signal SW1 is input, the system controller 50 starts the AF processing, AE processing, AWB processing, EF processing, etc.

The second shutter switch 64 is switched on to generate a second shutter switch signal SW2 when the shutter button is fully operated or fully pressed to give a photographing instruction. When the second shutter switch signal SW2 is input, the system controller 50 starts a series of photographing processes from signal reading from the image pickup device 22 to image data writing to a recording medium 200.

The operation unit 70 acts as function buttons each of which assigns a function suitable for scene when any of function icons displayed on the display unit 28 is selected by the user. The function buttons include an end button, return button, image shift button, jump button, aperture step-down button, attribute change button, etc.

The operation unit 70 has a controller wheel (which can be a so-called touch wheel) for use by the user to input an instruction to the system controller 50.

The digital camera 100 has a power switch 72, a power controller 80, and a power unit 30. The power controller 80 includes a battery detection circuit, a DC-DC converter, a switch circuit for selecting blocks of the camera 100 to be supplied with electric power, etc., and detects battery attachment/detachment, battery type, and battery residual capacity. The power unit 30 is implemented by a primary battery such as an alkaline battery or a lithium battery, or a secondary battery such as a NiCd battery, NiMH battery or Li battery, or an AC adapter.

Reference numeral 18 denotes an interface with the recording medium 200. The recording medium 200 is a memory card or the like implemented by, e.g., a semiconductor memory or a magnetic disk.

Figure 2A:
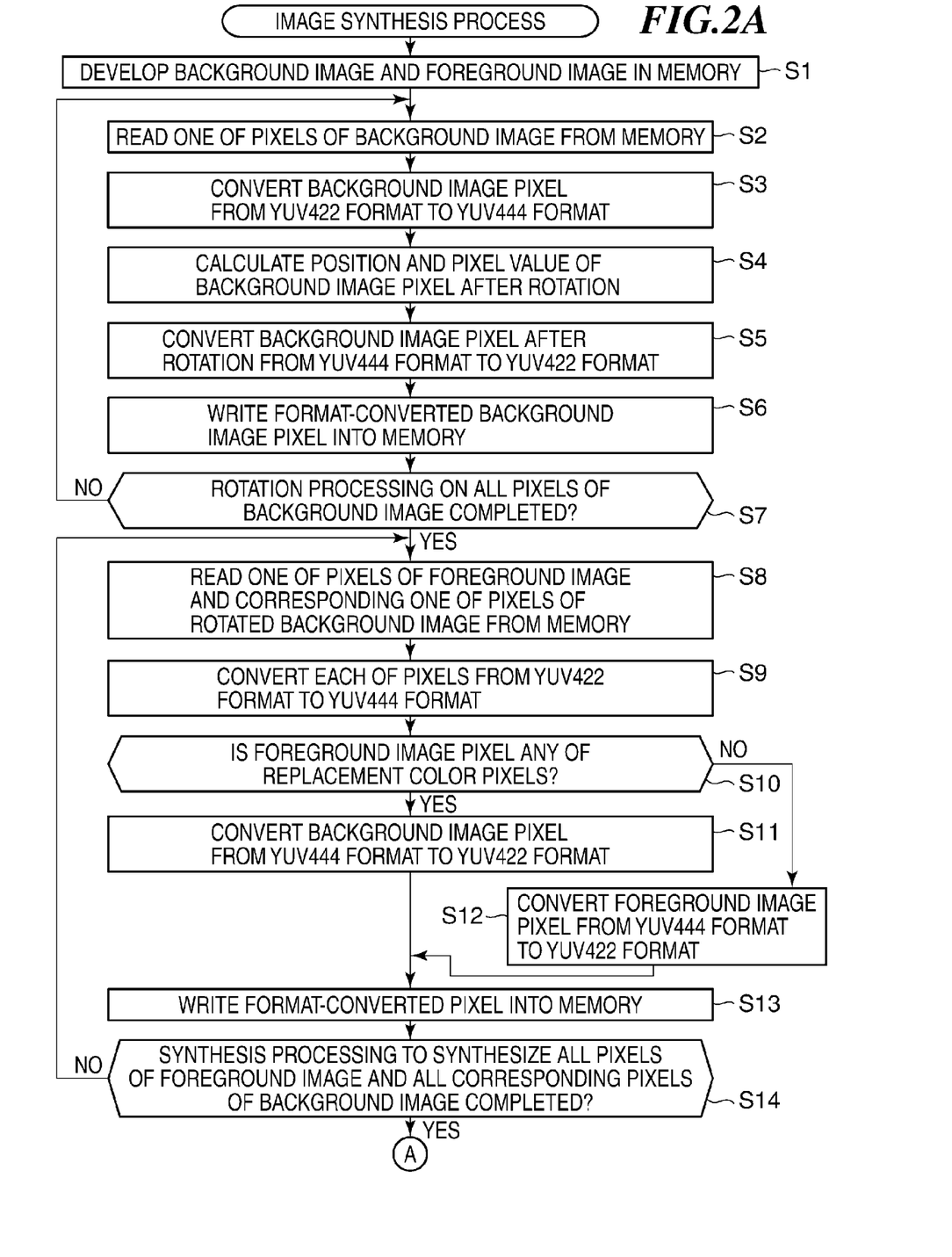
FIGS. 2A and 2B are a flowchart showing the procedures of an image synthesis process executed according to an instruction to rotate a foreground image and synthesize the rotated foreground image with a background image.
Figure 2B:
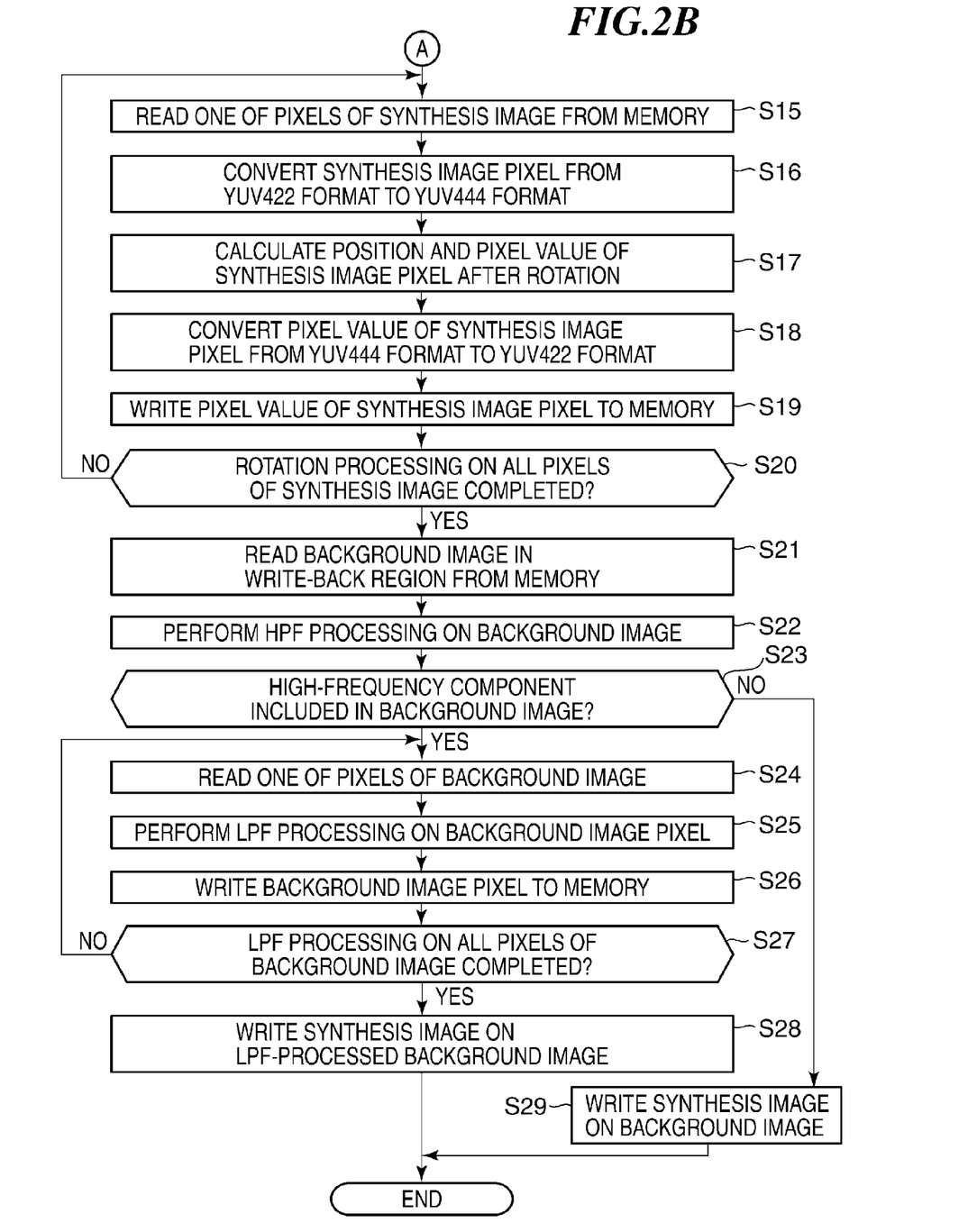
Figure 3:
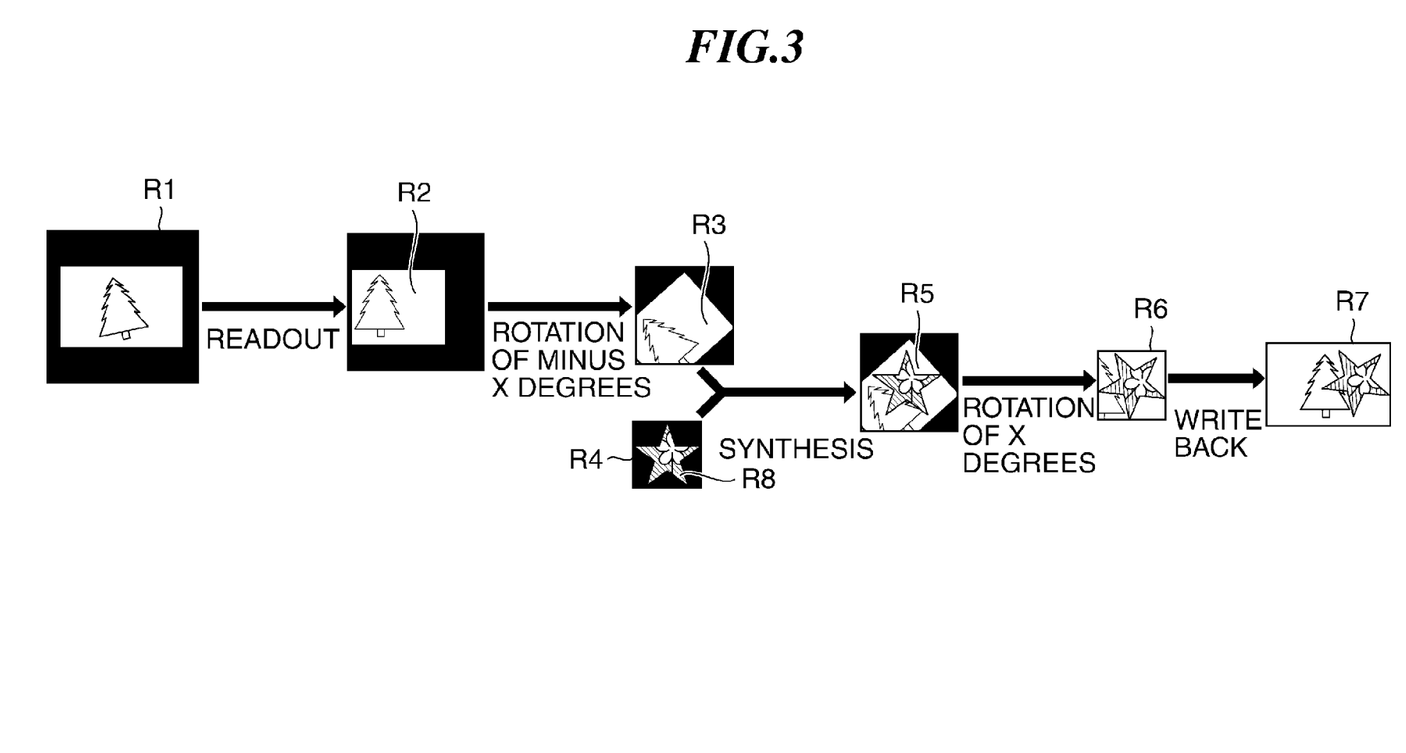
FIG. 3 is a view showing a process in which the foreground and background images are synthesized in accordance with the image synthesis process of FIGS. 2A and 2B.
Figure 4:
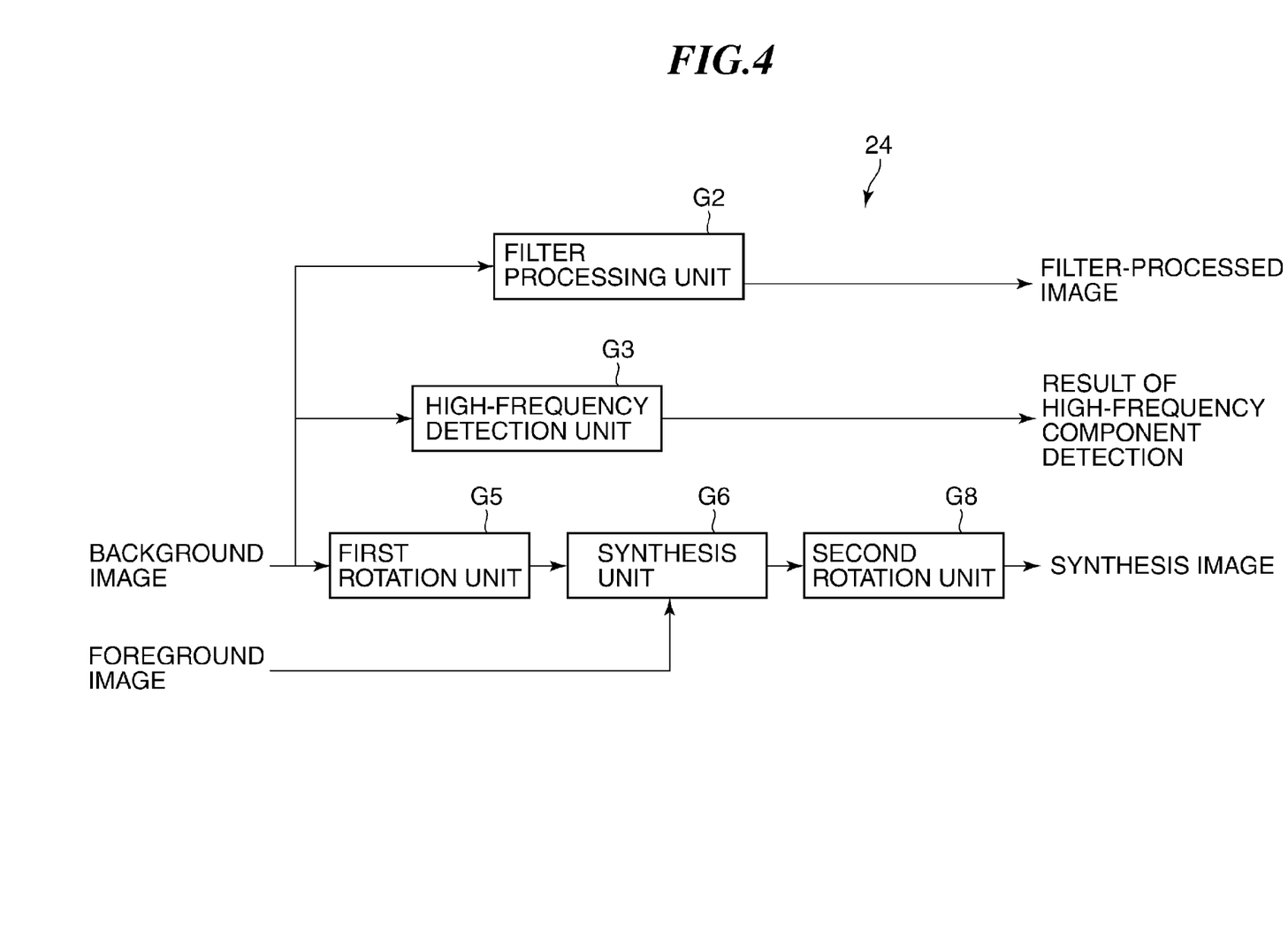
FIG. 4 is a block diagram showing the construction of an image processor of the digital camera that executes the image synthesis process of FIGS. 2A and 2B.

Next, an image synthesis process executed by the digital camera 100 will be described. First, a description will be given of an image synthesis process executed in accordance with an instruction to rotate a foreground image and synthesize the rotated foreground image with a background image. FIGS. 2A and 2B are a flowchart showing the image synthesis process, FIG. 3 shows a process in which the foreground and background images are synthesized, and FIG. 4 shows in block diagram the construction of the image processor 24.

The image synthesis process starts when the instruction to rotate the foreground image by an instructed rotation angle (e.g., an angle of X degrees) and synthesize the rotated foreground image with the background image is input by the user.

In the image synthesis process, the memory controller 15 identifies the background image and the foreground image (which are shown at R1 and R4 in FIG. 3, respectively) in accordance with the user's instruction, and develops the background image R1 and the foreground image R4 in the memory 32 (step S1). Next, the memory controller 15 reads one of pixels of a background image R2 located in a readout region (synthesis object region) among the background image R1 developed in the memory 32, and supplies the read pixel to a first rotation unit G5 (shown in FIG. 4) of the image processor 24 (step S2).

The first rotation unit G5 converts the input pixel of the background image R2 from YUV422 format to YUV444 format (step S3), rotates the format-converted pixel by an angle of minus X degrees (i.e., rotates the pixel by the instructed rotation angle of X degrees in a direction opposite to an instructed rotation direction), and calculates a position and a pixel value of the background image pixel after the rotation (step S4). Next, the first rotation unit G5 converts the background image pixel after the rotation from YUV444 format to YUV422 format, and outputs the format-converted pixel (step S5).

The memory controller 15 writes the format-converted background image pixel into the memory 32 (step S6), and determines whether the rotation processing has been performed on all the pixels of the background image R2 (step S7). If the answer to step S7 is NO, the process returns to step S2 where the next pixel of the background image R2 is input to the rotation unit G5. If the answer to step S7 is YES, the process proceeds to step S8.

In step S8, the memory controller 15 reads one of pixels of the foreground image R4 and a corresponding one of pixels of the rotated background image R3 from the memory 32, and supplies these pixels to a synthesis unit G6 shown in FIG. 4.

The synthesis unit G6 converts the input pixel of the background image R3 and the input pixel of the foreground image R4 from YUV422 format to YUV444 format (step S9), and determines whether the pixel of the foreground image R4 is any of replacement color pixels R8 (step S10). If the answer to step S10 is NO, the process proceeds to step S12. If the answer to step S10 is YES, the process proceeds to step S11.

In step S11, the synthesis unit G6 converts the pixel of the background image R3 from YUV444 format to YUV422 format. In step S12, the synthesis unit G6 converts the pixel of the foreground image R4 from YUV444 format to YUV422 format.

In step S13, the synthesis unit G6 writes, into the memory 32, the pixel of the background image R3 converted to YUV422 format in step S11 or the pixel of the foreground image R4 converted to YUV422 format in step S12, as a pixel of synthesis image R5.

Next, the synthesis unit G6 determines whether the synthesis processing has been performed on all the pixels of the foreground image R4 and all the corresponding pixels of the background image R3 (step S14). If the answer to step S14 is NO, the process returns to step S8 where the next pixel of the foreground image R4 and the corresponding next pixel of the rotated background image R3 are input to the synthesis unit G6. If the answer to step S14 is YES, the process proceeds to step S15.

In step S15, the memory controller 15 reads from the memory 32 one of pixels of the synthesis image R5, and supplies the read pixel to a second rotation unit G8 shown in FIG. 4.

The second rotation unit G8 converts the input pixel of the synthesis image R5 from YUV422 format to YUV444 format (step S16), rotates the pixel by the instructed rotation angle of X degrees in the instructed rotation direction, and calculates a position and a pixel value of the synthesis image pixel after the rotation (step S17).

Next, the second rotation unit G8 converts the calculated pixel value of the rotated pixel of the synthesis image R6 from YUV444 format to YUV422 format (step S18), and the memory controller 15 writes to the memory 32 the format-converted pixel value of the rotated pixel of the synthesis image R6 (step S19).

Next, the memory controller 15 determines whether the rotation processing has been performed on all the pixels of the synthesis image R5 (step S20). If the answer to step S20 is NO, the process returns to step S15 where the next pixel of the synthesis image R5 is supplied to the rotation unit G8. If the answer to step S20 is YES, the process proceeds to step S21.

In step S21, the memory controller 15 reads from the memory 32 the background image R2 located in a write-back region, and supplies the read background image R2 to a high-frequency detection unit G3 shown in FIG. 4.

The high-frequency detection unit G3 performs, on the input background image R2, HPF processing with a cutoff frequency specified by the system controller 50, and outputs to the system controller 50 a detection result indicating the presence or absence of a high-frequency component exceeding the cutoff frequency (step S22).

The system controller 50 determines whether the background image R2 includes a high-frequency component (edge) exceeding the cutoff frequency based on the detection result input from the high-frequency detection unit G3 (step S23). If the answer to step S23 is NO, the system controller 50 writes the synthesis image R6 on the background image R1 to thereby generate a final synthesis image R7 (step S29), and completes the image synthesis process.

On the other hand, when determining that the background image R2 includes a high-frequency component (i.e., if YES to step S23), the memory controller 15 reads one of the pixels of the background image R1 and supplies the read pixel to a filter processing unit G2 shown in FIG. 4 (step S24). The filter processing unit G2 converts the input pixel from YUV422 format to YUV444 format, and performs LPF (lowpass filter) processing with a cutoff frequency specified by the system controller 50 on the format-converted pixel, and outputs the LPF-processed pixel (step S25).

Next, the memory controller 15 writes the LPF-processed pixel to the memory 32 (step S26), and determines whether the LPF processing has been performed on all the pixels of the background image R1 (step S27). If the answer to step S27 is NO, the process returns to step S24 where the next pixel of the background image R1 is supplied to the filter processing unit G2. If the answer to step S27 is YES, the process proceeds to step S28.

In step S28, the memory controller 15 writes the synthesis image R6 on the LPF-processed background image R1 to thereby generate a final synthesis image R7, and completes the image synthesis process.

As described above, in the image synthesis process of FIGS. 2A and 2B, image processing is not performed on the replacement color pixels R8 in the foreground image R4. As a result, the replacement color pixels R8 are prevented from being mixed in the synthesis image, so that the synthesis image with a sharp boundary can be generated. In addition, since a portion of the background image R1, which is extracted from the background image R1 (i.e., the background image R2 which is the same in size as the foreground image R4), is synthesized with the foreground image R4, the speed of the image synthesis process can be improved as compared to a case where the entire background image R1 is synthesized with the foreground image R4.

Due to interpolation processing performed when the synthesis image R6 is generated by rotating the background image R2 extracted from the background image R1 and by synthesizing the rotated background image R3 with the foreground image R4, the contribution of high-frequency components to the synthesis image R6 decreases. Accordingly, if there are much high-frequency components in a portion of the background image R1 around the background image R2, a frequency component difference between the background image R1 and the synthesis image R6 in the final synthesis image R7 becomes large. As a result, the periphery of the rectangular region in the final synthesis image R7 to which the synthesis image R6 is written becomes highly visible, resulting in deteriorated image quality.

To obviate this, in the image synthesis process, LPF processing is performed on the background image R1, if it is determined that the background image R2 includes a high-frequency component (edge) exceeding the HPF cutoff frequency, as described in steps S21 to S26 of FIG. 2B, thereby decreasing the frequency component difference between the portion of the background image R1 around the background image R2 and the synthesis image R6.

Figure 5A:
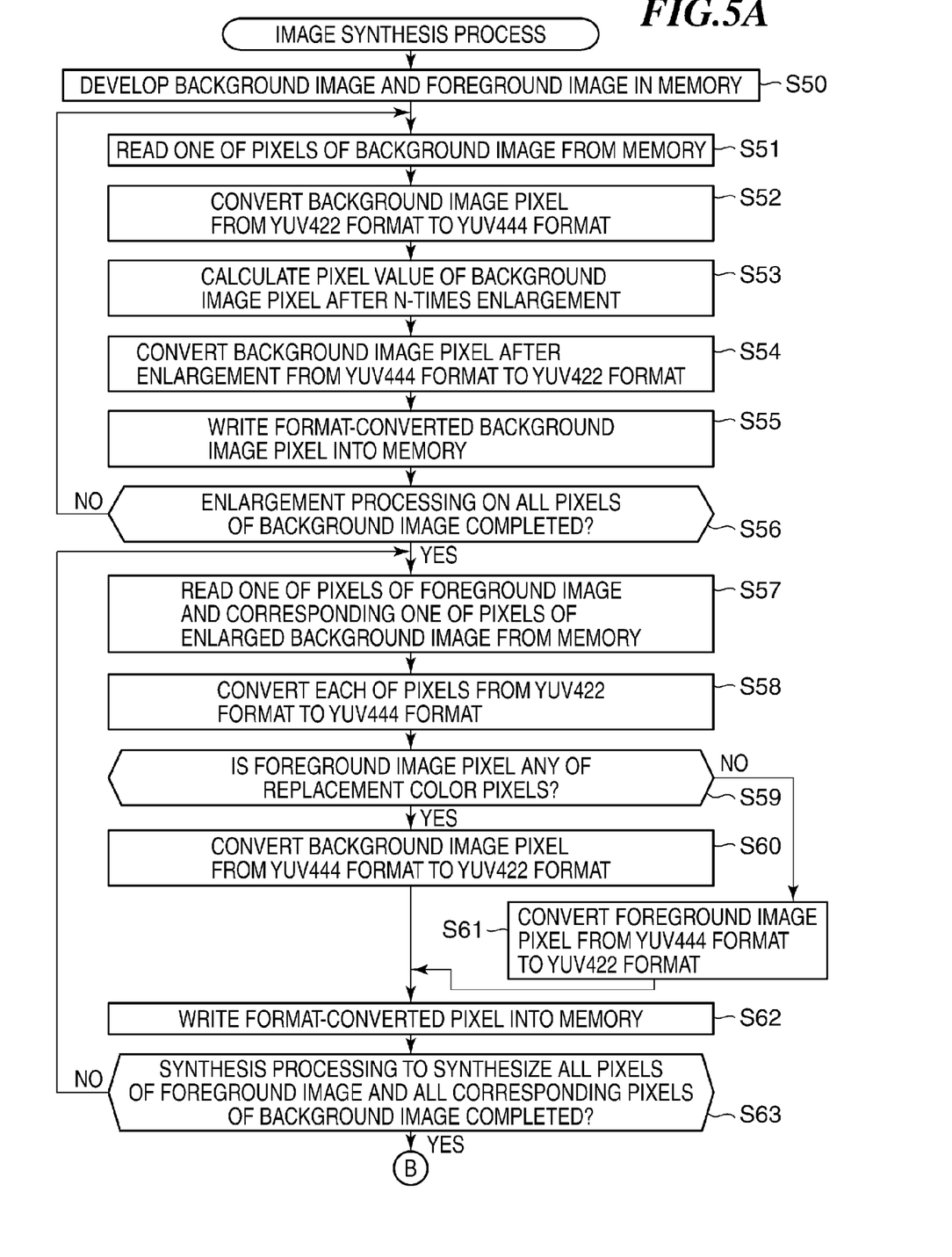
FIGS. 5A and 5B are a flowchart showing the procedures of an image synthesis process executed in accordance with an instruction to zoom a foreground image and synthesize the zoomed foreground image with a background image.
Figure 5B:
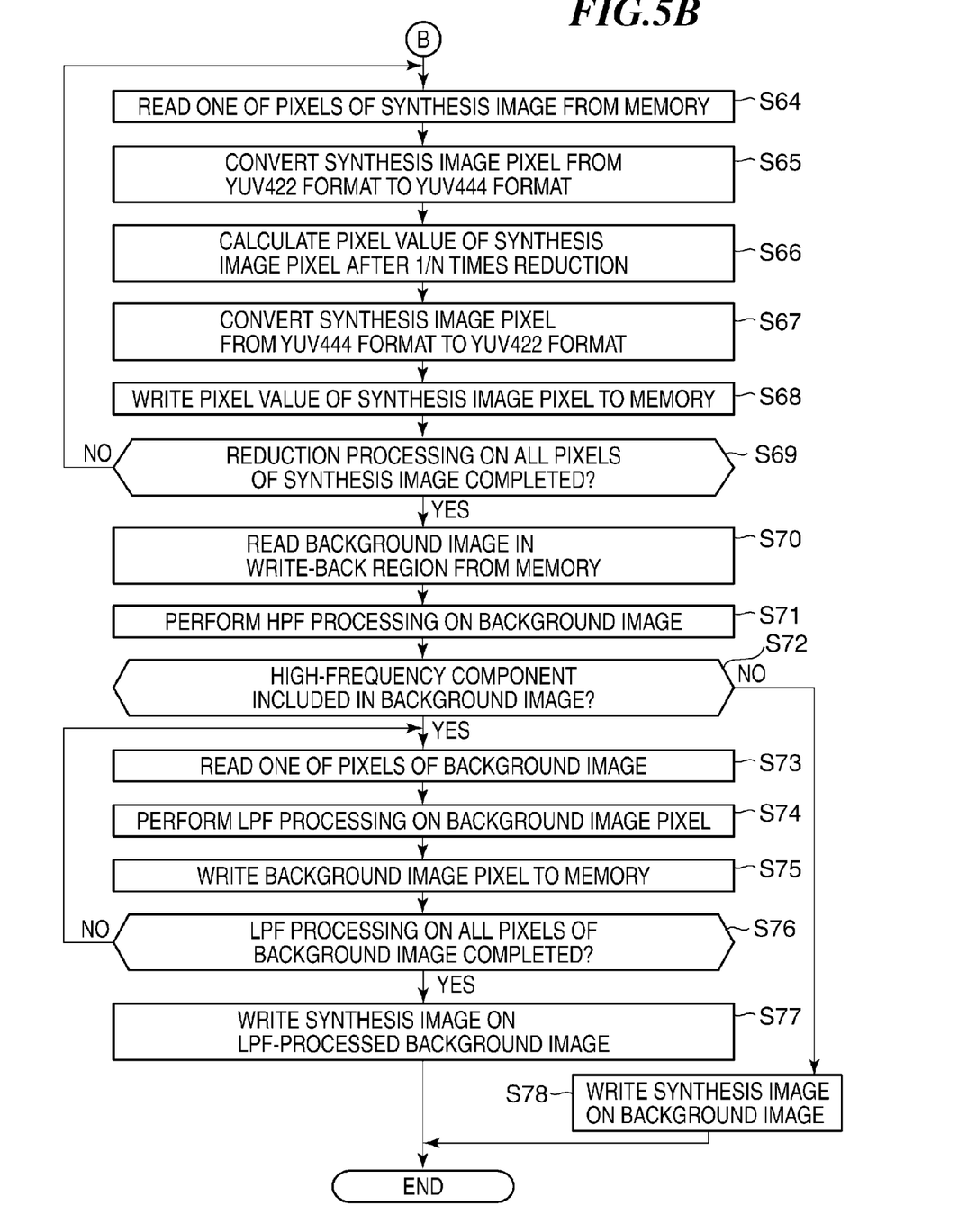
Figure 6:
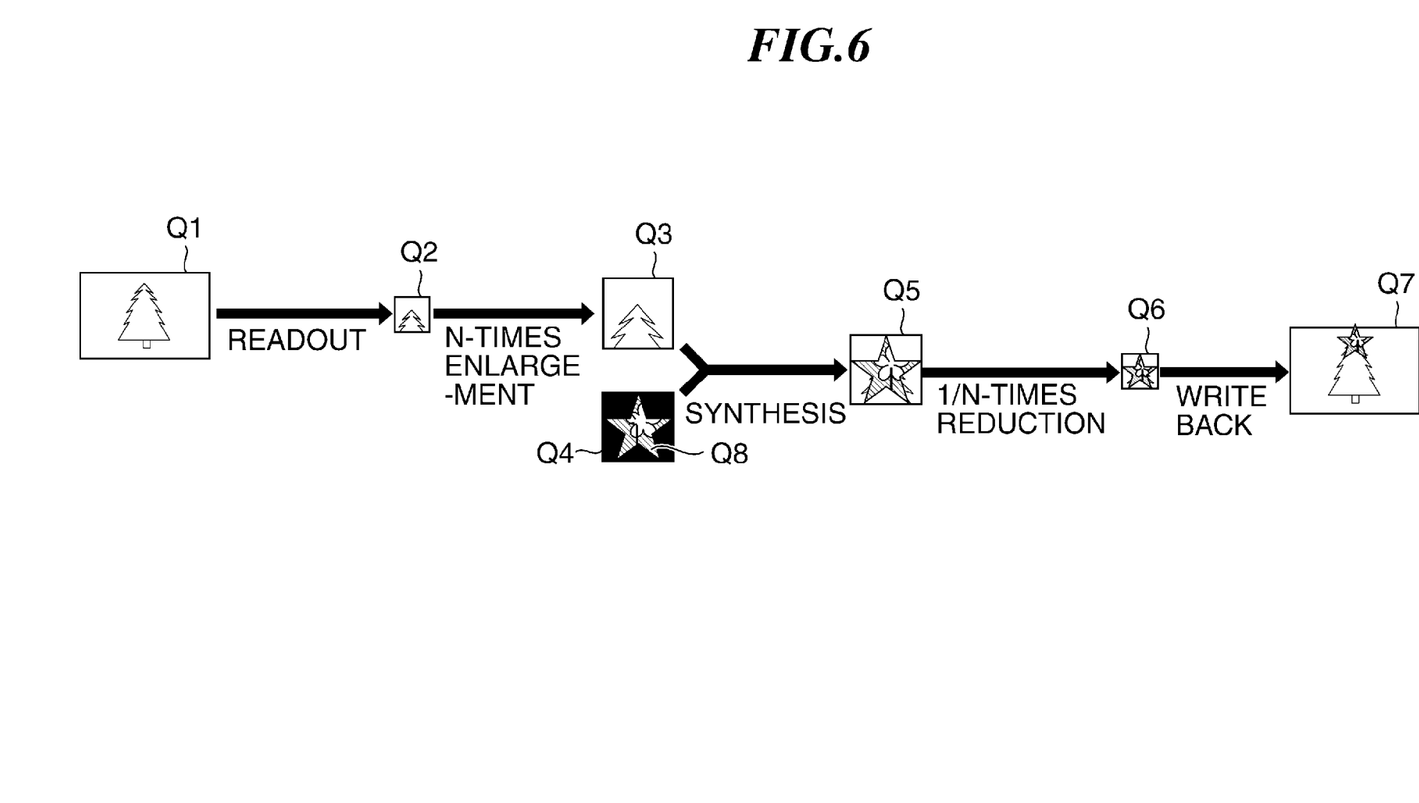
FIG. 6 is a view showing a process in which the foreground and background images are synthesized in accordance with the image synthesis process of FIGS. 5A and 5B.
Figure 7:
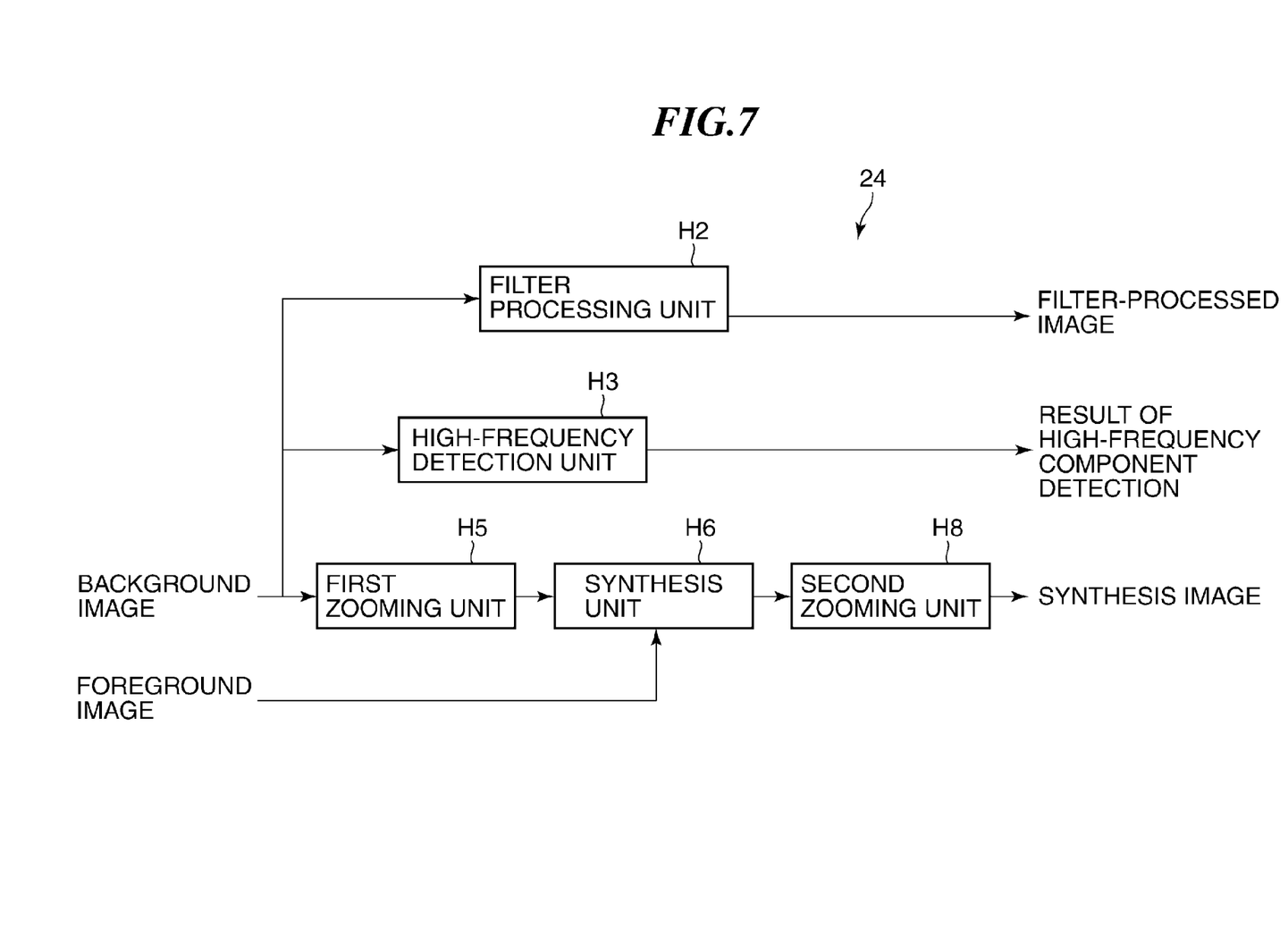
FIG. 7 is a block diagram showing the construction of the image processor that executes the image synthesis process of FIGS. 5A and 5B.

Next, a description will be given of an image synthesis process executed in accordance with an instruction to zoom a foreground image and synthesize the zoomed foreground image with a background image. FIGS. 5A and 5B are a flowchart showing the image synthesis process, FIG. 6 shows a process in which the foreground and background images are synthesized, and FIG. 7 shows in block diagram the construction of the image processor 24.

The image synthesis process is realized by the system controller 50 by developing, in the system memory 52, a program stored in the nonvolatile memory 56 and by executing the developed program.

The image synthesis process starts when the instruction to zoom the foreground image at a predetermined magnification (e.g., 1/N reduction) and synthesize the zoomed foreground image with the background image is input by the user.

In the image synthesis process, the memory controller 15 identifies the background image and the foreground image (which are shown at Q1 and Q4 in FIG. 6, respectively) in accordance with the user's instruction, and develops the background image Q1 and the foreground image Q4 in the memory 32 (step S50). Next, the memory controller 15 reads one of pixels of a background image Q2 located in a readout region (synthesis object region) among the background image Q1 developed in the memory 32, and supplies the read pixel to a first zooming unit H5 (shown in FIG. 7) of the image processor 24 (step S51).

The first zooming unit H5 converts the input pixel of the background image Q2 from YUV422 format to YUV444 format (step S52), enlarges the format-converted pixel by N times, and calculates a pixel value of the enlarged background image pixel (step S53). Next, the zooming unit H5 converts the enlarged background image pixel from YUV444 format to YUV422 format, and outputs the format-converted pixel (step S54).

The memory controller 15 writes the format-converted background image pixel into the memory 32 (step S55), and determines whether the enlargement processing has been performed on all the pixels of the background image Q2 (step S56). If the answer to step S56 is NO, the process returns to step S51 where the next pixel of the background image Q2 is input to the zooming unit H5. If the answer to step S56 is YES, the process proceeds to step S57.

In step S57, the memory controller 15 reads one of pixels of the foreground image Q4 and a corresponding one of pixels of the enlarged background image Q3 from the memory 32, and supplies these pixels to a synthesis unit H6 shown in FIG. 7. The synthesis unit H6 converts the input pixel of the background image Q3 and the input pixel of the foreground image Q4 from YUV422 format to YUV444 format (step S58).

Next, the synthesis unit H6 determines whether the pixel of the foreground image Q4 is any of replacement color pixels Q8 (step S59). If the answer to step S59 is YES, the process proceeds to step S60 where the pixel of the background image Q3 is converted from YUV444 format to YUV422 format. On the other hand, if it is determined that the pixel of the foreground image Q4 is not any of the replacement color pixels Q8 (i.e., if NO to step S59), the process proceeds to step S61 where the pixel of the foreground image Q4 is converted from YUV444 format to YUV422 format.

Next, the memory controller 15 writes, into the memory 32, the pixel of the background image Q3 converted to YUV422 format in step S60 or the pixel of the foreground image Q4 converted to YUV422 format in step S61, as a pixel of the synthesis image Q5 (step S62). Next, the memory controller 15 determines whether the synthesis processing has been performed on all the pixels of the foreground image Q4 and all the corresponding pixels of the background image Q3 (step S63). If the answer to step S63 is NO, the process returns to step S57 where the next pixel of the foreground image Q4 and the corresponding next pixel of the enlarged background image Q3 are input to the synthesis unit H6. If the answer to step S63 is YES, the process proceeds to step S64 where the memory controller 15 reads from the memory 32 one of pixels of the synthesis image Q5, and supplies the read pixel to a second zooming unit H8 shown in FIG. 7.

The second zooming unit H8 converts the input pixel of the synthesis image Q5 from YUV422 format to YUV444 format (step S65), reduces the pixel to 1/N, and calculates a pixel value of the synthesis image pixel after the reduction (step S66). Next, the second zooming unit H8 converts the calculated pixel value of the reduced pixel of the synthesis image Q6 from YUV444 format to YUV422 format (step S67).

The memory controller 15 writes to the memory 32 the format-converted pixel value of the reduced pixel of the synthesis image Q6 (step S68), and determines whether the reduction processing has been performed on all the pixels of the synthesis image Q5 (step S69). If the answer to step S69 is NO, the process returns to step S64 where the next pixel of the synthesis image Q5 is supplied to the zooming unit H8. If the answer to step S69 is YES, the process proceeds to step S70.

In step S70, the memory controller 15 reads from the memory 32 the background image Q2 located in the writeback region, and supplies the read background image Q2 to a high-frequency detection unit H3. The high-frequency detection unit H3 performs, on the input background image Q2, HPF processing with a cutoff frequency specified by the system controller 50, and outputs to the system controller 50 a detection result indicating the presence or absence of a high-frequency component exceeding the cutoff frequency (step S71).

Next, the system controller 50 determines whether the background image Q2 includes a high-frequency component (edge) exceeding the cutoff frequency based on the detection result input from the high-frequency detection unit H3 (step S72). If the answer to step S72 is NO, the system controller 50 writes the synthesis image Q6 on the background image Q1 (step S78), and completes the image synthesis process.

On the other hand, when determining that the background image Q2 includes a high-frequency component (i.e., if YES to step S72), the memory controller 15 reads one of the pixels of the background image Q1 and supplies the read pixel to a filter processing unit H2 (step S73). The filter processing unit H2 converts the input pixel from YUV422 format to YUV444 format, performs LPF processing with a cutoff frequency specified by the system controller 50 on the format-converted pixel, and outputs the LPF-processed pixel (step S74).

Next, the memory controller 15 writes the LPF-processed pixel to the memory (step S75), and determines whether the LPF processing has been performed on all the pixels of the background image Q1 (step S76). If the answer to step S76 is NO, the process returns to step S73 where the next pixel of the background image Q1 is supplied to the filter processing unit H2. If the answer to step S76 is YES, the process proceeds to step S77.

In step S77, the memory controller 15 writes the synthesis image Q6 on the LPF-processed background image Q1 to thereby generate a final synthesis image Q7, and completes the image synthesis process.

As described above, in the image synthesis process of FIGS. 5A and 5B, image processing is not performed on the replacement color pixels Q8 in the foreground image Q4. Thus, the replacement color pixels Q8 are prevented from being mixed in the synthesis image, so that the synthesis image with a sharp boundary can be generated.

The following are main points of the above-described embodiment. Interpolation processing is generally performed on foreground image pixels in the case of synthesizing a foreground image and a background image by rotating or enlarging/reducing the foreground image and by replacing a portion of the background image with the rotated or enlarged/reduced foreground image. As a result, color mixing takes place at a boundary between replacement color pixels and other pixels (image data pixels) in the foreground image. In that case, color mixed pixels appear at a boundary between the background image and the foreground image, causing the boundary to become unclear.

To obviate this, in the image synthesis processing apparatus of the embodiment, the background image is rotated in a direction opposite to an instructed rotation direction instead of rotating the foreground image in the instructed rotation direction, or the background image is reduced/enlarged at an instructed magnification instead of enlarging/reducing the foreground image at the instructed magnification. Since the rotation processing or the enlargement/reduction processing is not performed on the foreground image, color mixing due to interpolation processing is not caused at the boundary between replacement color pixels and other pixels in the foreground image, thereby preventing color mixed pixels from appearing at the boundary between the foreground and background images to prevent the boundary from becoming unclear.

The background image is then rotated in the direction opposite to the instructed rotation direction or is reduced/enlarged at the instructed magnification, and the resultant background image is synthesized with the original foreground image (i.e., the foreground image on which the rotation processing or the enlargement/reduction processing has not been performed) to generate a synthesis image, which is then rotated in the instructed direction or is enlarged/reduced at the instructed magnification, thereby generating a final synthesis image. The final synthesis image is equivalent to an ordinary synthesis image, which is generated by synthesizing the background image with the foreground image after rotation in the instructed direction or after enlargement/reduction at the instructed magnification. Furthermore, color mixing is not caused between replacement color pixels and image data pixels in the foreground image, unlike the ordinary synthesis image. Accordingly, color mixing does not take place at the boundary between the foreground and background images in the final synthesis image, so that the final synthesis image becomes clear.

More specifically, if an instruction to rotate a foreground image by a predetermined rotation angle and synthesize the resultant image with a background image is given, the background image is rotated by the first image rotation processing unit (first rotation unit G5) by the instructed rotation angle in a direction opposite to an instructed rotation direction. If an instruction to enlarge a foreground image at a predetermined magnification and synthesize the resultant image with a background image is given, the background image is reduced at the instructed magnification by the first image zoom processing unit (first zooming unit H5). If an instruction to reduce a foreground image at a predetermined magnification and synthesize the resultant image with a background image is given, the background image is enlarged at the instructed magnification by the first image zoom processing unit (first zooming unit H5).

Next, the background image after rotation or enlargement or reduction is synthesized with the original foreground image by the synthesis processing unit (synthesis unit G6 or H6), thereby generating a synthesis image. Next, the synthesis image is rotated by the second image rotation processing unit (rotation unit G8) by the instructed rotation angle in the instructed rotation direction or is enlarged or reduced at the instructed magnification by the second image zoom processing unit (zooming unit H8), whereby a final synthesis image is generated.

To improve the image synthesis process speed, the entire background image R1 or Q1 is not made synthesized with the foreground image R4 or Q4, but only the region of the background image R1 or Q1 which is the same in size as the foreground image (i.e., only the background image R2 or Q2) is made synthesized with the foreground image R4 or Q4. To this end, the background image R2 or Q2 is extracted from the background image R1 or Q1 by the extraction unit (the memory controller 15 and the system controller 50).

If an image contour or a boundary is included in the background image R2 or Q2, the contribution of a high-frequency component corresponding to the image contour or boundary to the synthesis image R6 or Q6 decreases in the generation of the synthesis image R6 or Q6 by synthesizing the background image R2 or Q2 with the foreground image R4 or Q4. As a result, a boundary between the background image R1 or Q1 and the synthesis image R6 or Q6 becomes highly visible in the final synthesis image R7 or Q7, resulting in deteriorated image quality.

To obviate this, the presence or absence of a high-frequency component in the background image R2 or Q2 is detected by the high-frequency detection unit (high-frequency detection unit G3 or H3), and if it is determined that there is a high-frequency component, LPF (lowpass filter) processing is performed on the background image R1 or Q1 by the filter processing unit, and the synthesis image R6 or Q6 is written on the LPF-processed background image R1 or Q1 by the write-back unit to thereby generate the final synthesis image R7 or Q7, while suppressing image quality deterioration.

According to the above-described embodiment, the foreground image and the background image can be synthesized into the final synthesis image, which is sharp and natural in color, with a simple system construction that does not require a special hardware structure and special arithmetic processing, without causing color mixing at a boundary between replacement color pixels and other pixels in the foreground image, even if image processing is performed in YUV422 format.

The present invention is applicable to various image synthesis processing apparatuses used for image syntheses such as slideshow, image reproduction, and stamp synthesis.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-227606, filed Oct. 7, 2010, which is hereby incorporated by reference herein in its entirety.

What is claimed is:

1. An image synthesis processing apparatus comprising:
   an extraction unit configured to extract from a background image a background image portion which is located in a synthesis object region;
   a first image rotation processing unit configured to rotate the background image portion by an instructed rotation angle in an opposite direction which is opposite to an instructed rotation direction;
   a synthesis processing unit configured to synthesize the background image portion after rotation and an original foreground image including replacement color pixels which are replaced by pixels in the rotated background image portion, thereby generating a synthesis image;
   a second image rotation processing unit configured to rotate the synthesis image by the instructed rotation angle in the instructed rotation direction; and
   a write-back unit configured to write back the synthesis image rotated by said second image rotation processing unit to a whole of the background image.

2. The image synthesis processing apparatus according to claim 1, further including:
   a high-frequency detection unit configured to detect presence or absence of a high-frequency component in the background image; and
   a filter processing unit configured to perform lowpass filter processing on the background image in a case where said high-frequency detection unit detects the high-frequency component,
   wherein said synthesis processing unit synthesizes the original foreground image and the background image on which the lowpass filter processing has been performed.

3. The image synthesis processing apparatus according to claim 1, wherein at least one of the background image and the foreground image is a YUV422 format image.

4. An image synthesis processing method comprising:
   an extraction processing step of extracting from a background image a background image portion which is located in a synthesis object region;
   a first image rotation processing step of rotating the background image portion by an instructed rotation angle in an opposite direction which is opposite to an instructed rotation direction;
   a synthesis processing step of synthesizing the background image portion after rotation and an original foreground image including replacement color pixels which are replaced by pixels in the rotated background image portion, thereby generating a synthesis image;
   a second image rotation processing step of rotating the synthesis image by the instructed rotation angle in the instructed rotation direction; and
   a write-back processing step of writing back the synthesis image rotated by said second image rotation processing unit to a whole of the background image.

* * * * *